United States Patent [19]

Wicks et al.

[11] 4,270,675

[45] Jun. 2, 1981

[54] POWDER FEED APPARATUS

[75] Inventors: Ruel E. Wicks, Manchester; Herbert A. Tourtellotte, East Hartford, both of Conn.

[73] Assignee: United Technologies Corporation, Hartford, Conn.

[21] Appl. No.: 88,807

[22] Filed: Oct. 29, 1979

[51] Int. Cl.³ .................... B65G 65/40; B65G 69/00
[52] U.S. Cl. ................................... 222/196; 222/409
[58] Field of Search .............. 222/196, 200, 372, 383, 222/409; 291/22–24, 28, 30, 41, 46; 346/140 R, 140 PD

[56] References Cited

U.S. PATENT DOCUMENTS

| 2,070,953 | 2/1937 | Morgan | 222/200 X |
| 2,174,348 | 9/1939 | Damond | 222/196 |
| 2,254,448 | 9/1941 | Pursel | 222/200 |
| 3,204,832 | 9/1965 | Barber | 222/196 |
| 4,011,969 | 3/1977 | Martin | 222/196 |

FOREIGN PATENT DOCUMENTS 372142  5/1973  U.S.S.R. ............................ 222/409

Primary Examiner—David A. Scherbel
Attorney, Agent, or Firm—Charles E. Sohl

[57] ABSTRACT

An improved apparatus for feeding uniform controlled amounts of powder is provided. The apparatus includes a nozzle, a powder delivery tube which communicates the nozzle with the powder feed apparatus and a vibrator assembly. The vibrator assembly drives a drive rod located within the powder feed tube so that a constant powder flow rate is insured.

2 Claims, 1 Drawing Figure

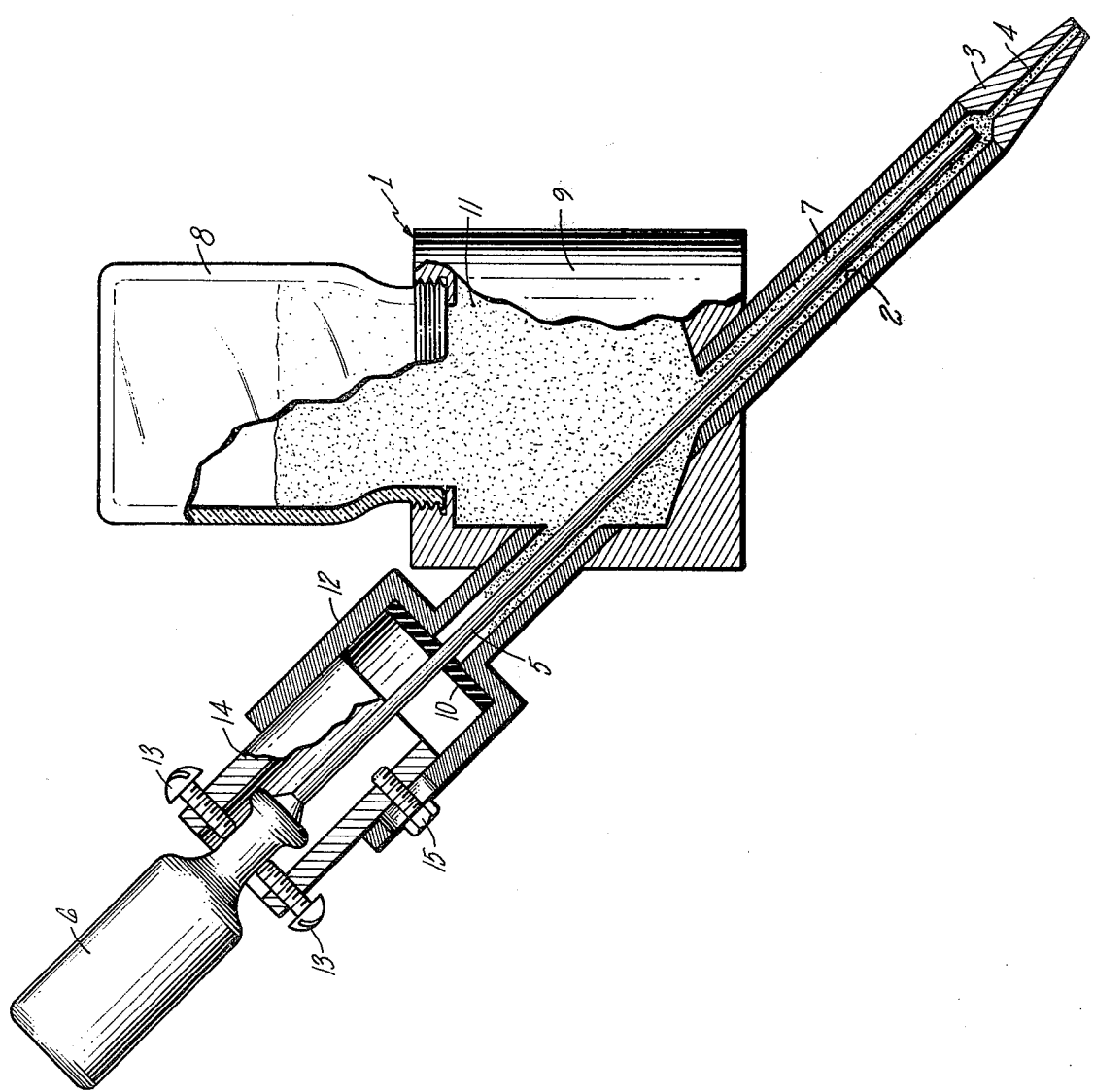

POWDER FEED APPARATUS

BACKGROUND OF THE INVENTION

Cross reference to related application. This invention has utility in the process described in U.S. patent application Ser. No. 088,808 filed concurrently herewith entitled "Article Fabricated by Sequential Layer Deposition".

1. Field of the Invention

This invention relates to an apparatus for feeding powder from a source through a nozzle at a controlled rate.

2. Description of the Prior Art

Many processes employ powders. These include various coating processes. For the effective practice for these processes, it is desirable that the powder flow rate be at a uniform rate and that the rate be controllable. In the prior art, many types of powder feeding mechanisms have been employed including feed apparatus using externally coupled vibrational sources and powder feed apparatuses which employ screw type delivery systems. So far as we are aware none of the prior art devices have used internal vibrating members which are surrounded by the powder to be fed.

BRIEF DESCRIPTION OF THE DRAWING

The FIGURE shows the details of the powder feed apparatus of the invention.

SUMMARY OF THE INVENTION

The apparatus of the invention provides a means for feeding powder at a constant controlled rate. This is accomplished by providing a powder delivery tube which communicates between a powder reservoir and a nozzle. Located axially within this tube is a powder drive rod which is driven by a vibrator. The provision of a vibrating drive rod within the powder feed device has been shown to be a most effective way to provide a steady controlled delivery rate of powders in the range of 1 gm/sec and below, although the system can obviously be scaled up.

The foregoing and other objects, features and advantages of the present invention will become more apparent in light of the following detailed description of the preferred embodiments thereof as discussed and illustrated in the accompanying drawing.

DESCRIPTION OF THE PREFERRED EMBODIMENT

The present invention is a powder feed apparatus which satisfies certain requirements which have not previously been satisfied to the best of our knowledge. The apparatus provides vibrationally assisted powder flow from a powder reservoir, through a downwardly sloping powder feed tube to a delivery nozzle.

The invention may be better understood through reference to the figure which shows the essentials of the invention. These essentials include a powder reservoir 1 which communicates downwardly extending the powder feed tube 2. The powder feed tube 2 terminates in a powder delivery nozzle 3 which has generally reduced interior passageway 4 through which the feed material passes.

Within the powder delivery tube 2, there is located a drive rod 5. This drive rod 5 is generally axially aligned within the powder delivery tube and is driven by a vibrator 6. The drive rod 5, in combination with the powder feed tube 2, define an annular passageway 7 through which the powder passes on its way from powder reservoir 1 to the powder delivery nozzle 3. The drive rod 5 extends from the point where the delivery tube 2 communicates with the powder reservoir 1 to the nozzle 3.

For many applications involving powders, it is desirable to provide either a vacuum atmosphere or other suitable inert atmosphere to minimize surface contamination. This is provided in the present device by the provision of a removable top 8 which is mounted in sealing relationship with the main powder reservoir body 9. As a further means for reducing undesirable powder contamination, the upper end of the powder feed tube 2 contains a pliable seal 10 between the powder feed tube 2 and the drive rod 5. This seal 10, is made of rubber, has sufficient compliance such that it can tolerate the motion of the vibrating rod for long periods of time without damage while providing an effective seal. The seal 10 is in a force fit relationship to the drive rod 5. Of course, other types of sealing arrangements such as a bellow might be employed.

In use, the powder 11 is placed in the powder feed reservoir 1. Under normal conditions in the absence of axial mechanical vibration of the drive rod, the powder will not flow or will flow only slowly and erratically through the powder feed tube 2. Application of axial mechanical vibration through the drive rod 5 encourages the powder to flow through the supply tube 2. The resultant powder flow is uniform and continuous.

The dimensions of this powder feed mechanism do not appear to be critical. For the assistance of those skilled in the art who wish to employ this apparatus exemplary dimensions are described below.

A powder feed mechanism was arranged as follows. A powder reservoir was fabricated having an inside diameter of about 2½ inches and a depth of about 3¾ inches and was surmounted by a threaded glass container 8. This apparatus was designed for use with metal powders of about −140 mesh size or an average particle size of about 0.003 inches. For use with this type of powder, a nozzle 3 having an inside diameter of 0.03 inches was provided.

This nozzle was attached to a powder feed tube having a ¼ inch inside diameter. A ⅛ inch diameter drive rod was aligned within the powder feed tube and was driven by an electromechanical vibrator which vibrated the drive rod at a frequency of 120 Hz and an amplitude of 0.020 to 0.040 inches. Good results were obtained even when the drive rod 5 was not well centered although it is preferred that the drive rod 5 not contact the powder feed tube 2. The vibrator used was of the type used as engravers. The specific vibrator used was produced by the Dremel Corporation of Racine, Wisconsin (model 290). This vibrator had an amplitude of vibration in free air of about 0.020 to 0.040 inches. The length of the powder feed tube to the powder reservoir was about 6 inches.

Upon filling the powder reservoir with −140 mesh nickel powder, it was found that no powder flow would occur through the powder feed tube in the absence of vibration.

When the drive rod was vibrated according to the previously defined parameters, a continued steady flow powder is obtained at about 0.15 gm/sec. This experiment was repeated with a drive rod 1/16 inches in diameter and a ⅛ inch square diameter drive rod with only minor variation in powder mass flow.

Because of some concern that the vibrating of the drive rod might promote segregation of powder by size or density, experiments were performed with mixed powders of copper and aluminum. Optical evaluations of mixed copper and aluminum samples obtained from the nozzle outlet did not reveal any signs of segregation of these two powders which are substantially different in density.

An additional control over the powder feed rate is demonstrated in the figure. The vibrator 6 which is fixedly attached to the drive rod 5 is adjustably mounted with respect to the powder delivery tube 2. In the apparatus shown in the figure, this is accomplished by providing the powder delivery tube 2 with an enlarged portion 12. The vibrator 6 is attached by set screws 13 to a mounting collar 14 which is slideably mounted within the enlarged portion 12 of the powder delivery tube 2. Set screw 15 is provided to fix the relationship between the vibrator 6 and the powder delivery tube.

By positioning the vibrator so that the drive rod 5 extends to the nozzle the powder flow may be diminished and in the limit may be stopped. This effect is used as a positive shut off of powder. On the other hand, moving the drive rod so that its end is far removed from the nozzle also diminishes powder flow since the vibrations from the drive rod do not sufficiently affect the powder within the nozzle. In the apparatus described, a drive rod to nozzle spacing of about ¼ to 1 inch has proved to be satisfactory.

The apparatus of the present invention appears to function as a result of a very efficient coupling of vibration to the powder material. This results from the immersion of the drive rod within the powder and the fact that the direction of vibration of the rod is axial to the powder flow direction.

As an example, an apparatus as shown in the figure and previously described was evaluated under three sets of conditions. One condition was the exact arrangement shown in the figure, but without the vibrator being actuated. This condition did not produce any sustained powder flow. At best there was an irregular trickel of powder which was prone to stoppage. The second condition was similar to that shown and described, but the drive rod was removed and the vibrator was coupled to the nozzle. This produced a greater flow of powder, but the flow was still irregular. The third condition was the the same as the first with the vibrator being actuated. This actuation of the vibrator coupled to the axially arranged drive rod produced a very steady and continuous powder flow. The flow rate was about four times greater than the powder flow rate in the second condition.

These three conditons demonstrate the importance of coupling the vibration directly to the powder through an axial drive rod.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. An apparatus for feeding powder at a controlled constant rate consisting of:
    a. a powder reservoir;
    b. a downwardly sloping powder feed tube which terminates in a nozzle and which contains a passage which communicates between the powder reservoir and the nozzle;
    c. vibrating means for generating axial mechanical vibrations, said means being located external of the powder reservoir and powder feed tube;
    d. a drive rod connected to the vibrating means, said rod being located within the powder feed tube and ending in proximity to the nozzle, (without passing into or through the nozzle) and being adapted to reciprocate, in the direction of its length, relative to the powder feed tube.

2. An apparatus as in claim 1 which further includes a pliable seal which surrounds the drive rod and forms a seal between the drive rod and the powder feed tube.

* * * * *

UNITED STATES PATENT AND TRADEMARK OFFICE
CERTIFICATE OF CORRECTION

PATENT NO. : 4,270,675

DATED : June 2, 1981

INVENTOR(S) : Ruel E. Wicks and Herbert A. Tourtellotte

It is certified that error appears in the above—identified patent and that said Letters Patent is hereby corrected as shown below:

Column 1, after title insert the following:

--The invention herein described was made in the course of or under a contract or subcontract thereunder, with the Department of the Navy.--

Signed and Sealed this

Twenty-fifth Day of August 1981

[SEAL]

Attest:

Attesting Officer

GERALD J. MOSSINGHOFF

Commissioner of Patents and Trademarks